(12) United States Patent
Shokida et al.

(10) Patent No.: US 12,455,899 B2
(45) Date of Patent: Oct. 28, 2025

(54) DATA TRANSFORMATION USING BINARY SERIALIZATION FORMAT

(71) Applicant: Salesforce, inc., San Francisco, CA (US)

(72) Inventors: Leandro Shokida, Buenos Aires (AR); Mariano Jose De Achaval, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 61 days.

(21) Appl. No.: 17/661,235

(22) Filed: Apr. 28, 2022

(65) Prior Publication Data

US 2022/0350818 A1 Nov. 3, 2022

Related U.S. Application Data

(60) Provisional application No. 63/181,555, filed on Apr. 29, 2021.

(51) Int. Cl.
*G06F 16/28* (2019.01)
*G06F 16/22* (2019.01)
*G06F 16/2457* (2019.01)

(52) U.S. Cl.
CPC ........ *G06F 16/282* (2019.01); *G06F 16/2282* (2019.01); *G06F 16/24573* (2019.01)

(58) Field of Classification Search
CPC ............. G06F 16/282; G06F 16/24573; G06F 16/2282

See application file for complete search history.

(56) References Cited

U.S. PATENT DOCUMENTS

| | | | |
|---|---|---|---|
| 2002/0073096 A1* | 6/2002 | Shaath | G06F 3/0682 707/999.102 |
| 2004/0143791 A1* | 7/2004 | Ito | G06F 40/154 715/234 |
| 2005/0055334 A1* | 3/2005 | Krishnamurthy | G06F 16/86 |
| 2005/0228792 A1* | 10/2005 | Chandrasekaran | G06F 16/81 707/999.009 |
| 2005/0278289 A1* | 12/2005 | Gauweiler | G06F 16/252 |
| 2006/0206589 A1* | 9/2006 | Lentini | G06F 16/9577 709/219 |
| 2007/0208752 A1* | 9/2007 | Khaladkar | G06F 16/84 |
| 2008/0098001 A1* | 4/2008 | Gupta | G06F 16/258 |
| 2008/0098020 A1* | 4/2008 | Gupta | G06F 16/81 |
| 2013/0325907 A1* | 12/2013 | Montes de Oca | G06F 16/84 707/811 |

(Continued)

*Primary Examiner* — William P Bartlett
(74) *Attorney, Agent, or Firm* — Holland & Hart LLP

(57) ABSTRACT

A data formatting service may be configured to format files or documents for data transformation for utilization of the data by other services. The data formatting service may be configured to perform a method including receiving a dataset including a first file that includes a first set of elements formatted according to a first hierarchical structure, parsing the first file according to the first hierarchical structure to identify the first set of elements, modifying, based at least in part on the first set of elements, the first file to include metadata that describes a first element of the first set of elements, and storing the modified file in a binary format for access to the first element based at least in part on the metadata.

17 Claims, 11 Drawing Sheets

(56) References Cited

U.S. PATENT DOCUMENTS

2014/0067819 A1\* 3/2014 Novoselsky ............ G06F 16/83
707/741
2018/0300352 A1\* 10/2018 Sanchez Ribes ..... G06F 40/154
2019/0155875 A1\* 5/2019 Kuntschke ............ G06F 40/146

\* cited by examiner

DATA TRANSFORMATION USING BINARY SERIALIZATION FORMAT

CROSS REFERENCES

The present application for patent claims priority to U.S. Provisional Patent Application No. 63/181,555 by Shokida et al., entitled "DATA TRANSFORMATION USING BINARY SERIALIZATION FORMAT," filed Apr. 29, 2021, assigned to the assignee hereof and expressly incorporated by reference herein.

FIELD OF TECHNOLOGY

The present disclosure relates generally to database systems and data processing, and more specifically to data transformation using binary serialization format.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may make data available for utilization by various services. For example, data may be stored in a first format for access by a first service. Another service may access the data, but may require the data be stored using a different format. As such, the data may be accessed using the first format, and stored in a different format for access by the second service.

DETAILED DESCRIPTION

Data may be stored in files that are configured in a particular formats. For example, data may be stored according to a hierarchical configuration such as XML, CSV, JSON, HTML, etc. The data may be stored in such hierarchical configurations to support various services. In some examples, the data may be used by another service, but the data is to be reformatted for use by the other service. As such, a data transformation services may be used to convert a set of files from one format to another format. However, data transformation for hierarchical data may utilize significant processing and memory resources.

Techniques described herein support data modification into a binary format that may be efficiently accessed relative to other data transformation techniques. For example, hierarchically structured files may be read and modified using the techniques described herein. Thereafter, the data may be efficiently read and transformed for use by other services. In some cases, the files are modified to include metadata that describes various elements of the file such that the elements may be efficiently identified and read for transformation. The metadata may include examples of bytes for each elements or one or more indexes inserted into the files. In some examples, these techniques may support random access of elements of a file, thus limiting the need for reading an entirety of a file into memory for transformation. Accordingly, these techniques may support processor and memory efficient data transformation.

Aspects of the disclosure are initially described in the context of an environment supporting an on-demand database service. Aspects of the disclosure are further described with reference to a system architecture diagram showing file modification and data transformation and a process flow diagram. Aspects of the disclosure are further illustrated by and described with reference to apparatus diagrams, system diagrams, and flowcharts that relate to data transformation using binary serialization format.

Figure 1:
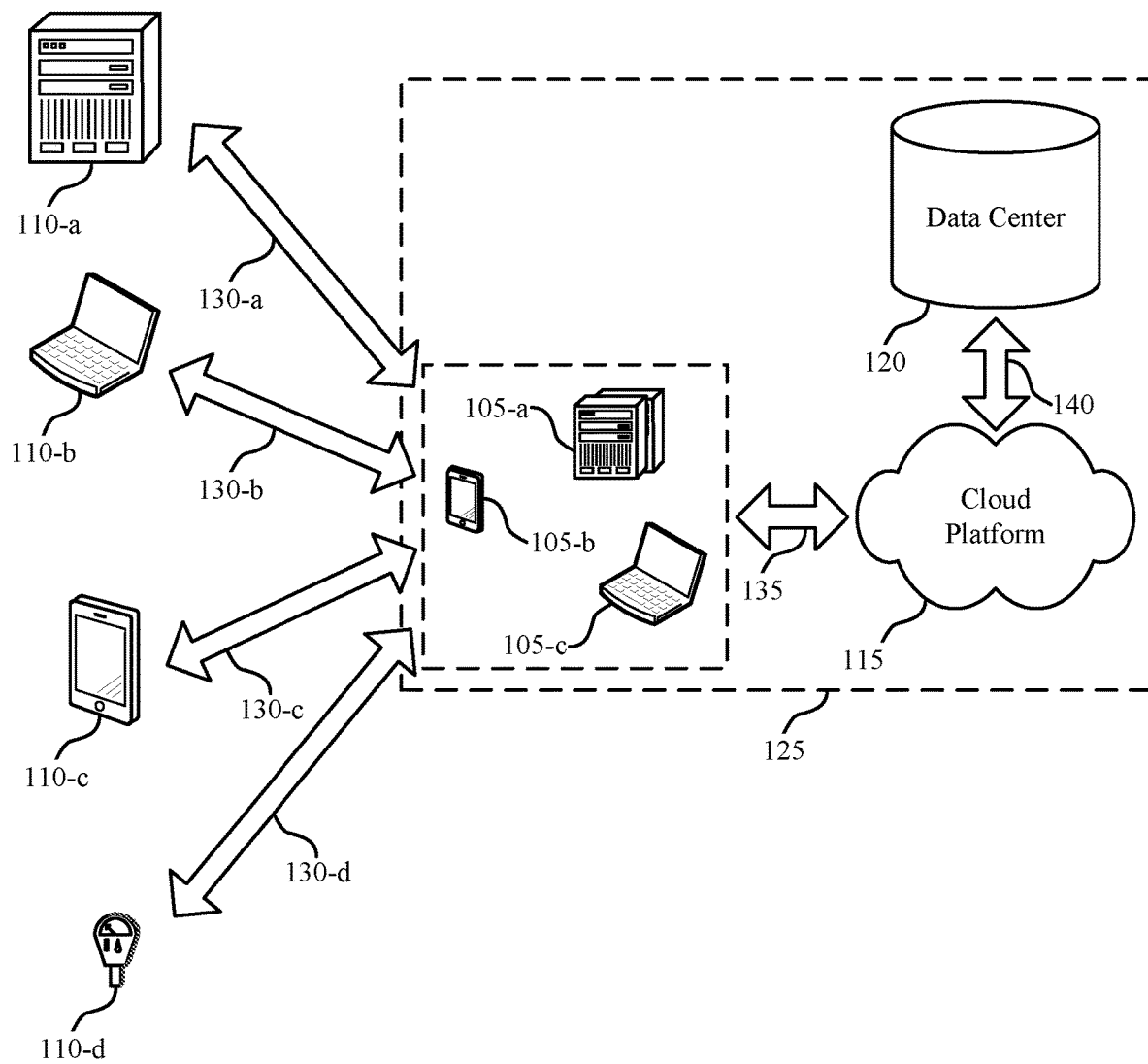
FIG. 1 illustrates an example of a data processing system that supports data transformation using binary serialization format in accordance with aspects of the present disclosure.

FIG. 1 illustrates an example of a system 100 for cloud computing that supports data transformation using binary serialization format in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 support various types of services that access data of the data center 120. In some cases, the data of the data center 120 is configured according to the services that accesses the data. For example, the data may be stored XML, CSV, HTML, JSON, or other types of formats for use by various services. In some cases, a service that is configured to access data of a first format may access data of the data center 120 that is stored in a second format. As such, the data may be transformed in order to be used by the service.

In some cases, data transformation services may load types of data into a document object model (DOM) in memory. The various elements of the DOM may then be accessed and written into another format. In other cases, data transformation services may sequentially read data and transform the data. Both techniques may be associated with significant resource overhead. For example, loading a large file as a DOM may use significant memory resources, while sequentially reading the data may be processor inefficient. Each of these techniques may require that all of the data is read, when only a portion of the data is required for the data transformation.

Techniques described herein support a file formatting component that modifies files to include metadata that describes the elements of the files. The files may be stored in a binary format and read by a service. The metadata may support efficient element access for efficient data transformation. In some cases, the metadata includes bytes (or other data lengths) of data inserted for each element (e.g., a key/value pair, object, etc.) and the byte may described the element type. Thus, when the binary file is read sequentially, the data transformation service may quickly identify the desired element type for transformation, which may be more efficient than reading a structured file. In other cases, the metadata may include one or more indexes that describe the various elements. The indexes may describe the element types, locations (e.g., based on an offset), name hashes, etc. The index may support random access to various elements of the data, which may support limited memory utilization compared to using a DOM or other data transformation techniques. These techniques are further described with respect to the following figures.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
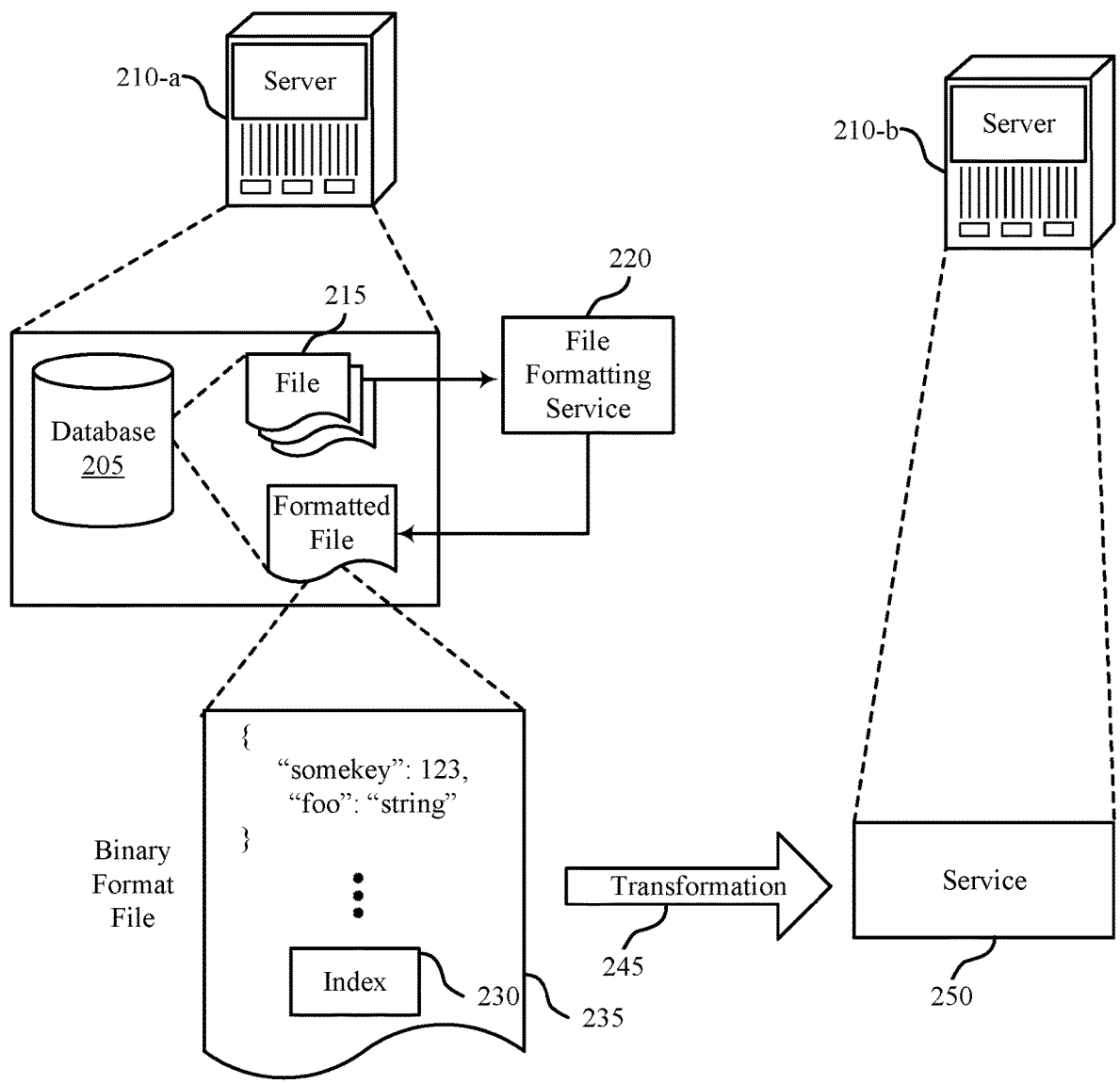
FIG. 2 illustrates an example of a system architecture that supports data transformation using binary serialization format in accordance with aspects of the present disclosure.

FIG. 2 illustrates an example of a system architecture 200 that supports data transformation using binary serialization format in accordance with aspects of the present disclosure. The system architecture 200 includes servers 210-a and 210-b. The servers 210 may represent various aspects of cloud platform 115, data center 120, and/or subsystem 125 of FIG. 1.

The server 210-a may support a service that accesses files 215 in a database 205. The files 215 may be formatted in a hierarchical structure, such as JSON, CSV, XML, HTML, etc. for use by the service, which may be an example of a web service. The hierarchical structures of the files may define various elements of the file, such as key/value pairs, objects, etc. The service may be configured to access the files according to the format. In some cases, another service, such as service 250 may access the files 215. However, the service 250 may use a different data format than is configured with files 215. In such cases, the data is transformed to another format (e.g., a transformation at 245).

Techniques described herein support a file formatting service 220 that modifies files 215 for efficient transformation at 245. The modification may include adding metadata such, as an index 230 or an index table that describes elements of the file. In other cases, bytes may be added to one or more elements of the file, and the bytes may describe the respective elements (e.g., an element type). The modified file 235 may be stored as a formatted file in a binary format. Thus, when the file is read for transformation at 245, the metadata may be used to efficiently identify elements for transformation. The file 235 illustrates example key/value pairs, but it should be understood that the modified file 235 may be stored in a binary format (thus without the key/value format illustrated).

The binary data format of formatted file 235 may include a superset of the other, such as XML, JSON, CSV and may reduce repetitive elements (e.g., keys, namespaces) such that one declaration is included and includes references to the one declaration. The file formatting service 220 may support an index mode and a non-indexed mode. The non-indexed mode is used to read data in a sequential way. The non-indexed mode may be designed so that data can be read either with a streaming reader in chunks or it can be loaded in memory with a DOM-like reader. In the non-indexed mode, before each value (e.g., an element value, such as a key/value pair) a 1 byte token may be inserted, and the token may indicate the type and specific metadata for the value depending on the type, such as the value length that allows a reader/transformer to move forward without having to parse that value.

In the indexed mode, the file formatting service 220 may include indexes (e.g., an index table including a set of indexes) at the end of the file, and the indexes may describe where the values are located in the file with a byte position, type of the values and hierarchical structure information such as nesting depth and the position of its first child (if present), which may be enough for a reader/transformer to navigate the hierarchical document. The index may encode the metadata that is used to retrieve the values from any part of the document using random access, without having to reparse the data. It may contain hashes of the values to perform comparisons with using the index.

According to various configurations, the index data (e.g., index 230 or an index table) may be written at the end (or other portion of the document) and may include some or all of the following structure:

|=> Name Entry (N*(2 bytes+NAME_LENGTH))
|=> Namespace Entry (N*(2 bytes+NAMESPACE_LENGTH))
|=> Global Tokens Entry (N*16 bytes)
|=> LocationCaches length (2 bytes)
|=> LC Level length (8 bytes)
|====> LC Entry (N*16 bytes)
|=> names index bytes (4 bytes)
|=> names index count (4 bytes)
|=> namespaces index bytes (4 bytes)
|=> namespaces index count (4 bytes)
|=> Global index length in longs (8 bytes)
|=> LC index length in bytes (8 bytes)

The name entry may be a list of entries or names that are present in the document. An element with a name may be replaced with an index to an entry in the index. Thus, a key may be replaced with a reference to the index/table. A global token index may contain a token for each relevant semantic element in the document and allows a reader/transformer to access the semantic elements directly and know the type, and in the case of the keys, may also include a hash value to support performing a pre-check to locate elements efficiently while comparing. The bit distribution of value tokens for the token index may be configured as follows:

40 bits→Starting offset
12 bits→Reserved
12 bits→Nesting depth
5 bits→Token type
1 bits→Schema Flag
58 bits→Length In some cases, tokens may include elements (e.g., "1") that show the type and position of the element. Other tokens may not be represented (e.g., "1"), because such information may be inferred from other information of the index. The bit distribution of key tokens of the global token index with namespaces (keys) may be configured as follows:

40 bits→Starting offset
12 bits→Name index
12 bits→Nesting depth
5 bits→Token type
16 bits→Hash
12 bits→Namespace index
31 bits→Qname length Offset values (e.g., starting offset) may be referenced relative to a beginning of a file. A locations cache index may include the hierarchical information of the elements in the documents. Entries may be organized by their nesting level and the index may contain a 64 bit entry for each element. The locations cache index may be configured with a bit distribution as follows:

32 bits→element position in the global index
32 bits→position of its first child in this structure The file formatting service 220 may support various value types, such as:

Null
Array
Object
Key (can have namespace and/or attributes)
True
False
String8
String32
Int
Long
BigInt
Double
BigDecimal
DateTime
LocalDate
Period
LocalDateTime
Time
LocalTime
TimeZone
Binary
Regex
Range Additionally, two token types may be used to support the binary format readers: DeclareName, DeclareNamespace.

These indexing and metadata techniques may support reading of flat file documents (e.g., binary format) without loading the documents (e.g., files 215) into memory by transforming them into this new format. Thus, the data may be parse in a single pass, since keeping track of the data for the index while writing is cheaper (in CPU time) and can be included in the serialized document. Thus, the service 250 may access the formatted file for transformation at 245 using the metadata that is added using the file formatting service 220.

Figure 3:
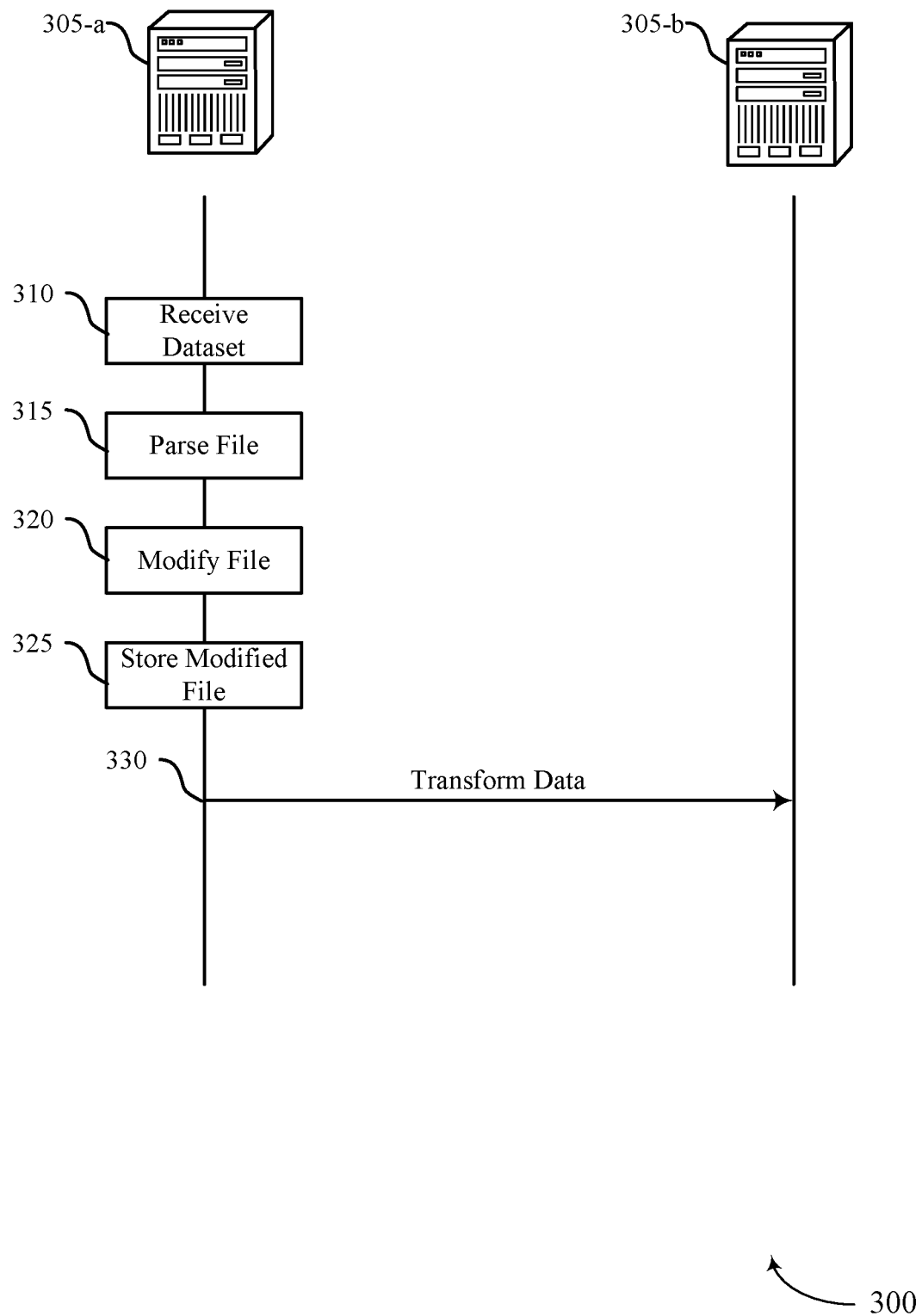
FIG. 3 illustrates an example of a process flow that supports data transformation using binary serialization format in accordance with aspects of the present disclosure.

FIG. 3 illustrates an example of a process flow diagram 300 that supports data transformation using binary serialization format in accordance with aspects of the present disclosure. The process flow diagram 300 includes a server 305-a and a server 305-b, which may be examples of the servers 210 of FIG. 2.

At 310, the server 305-a may receive a dataset including a first file that includes a first set of elements formatted according to a first hierarchical structure. The first hierarchical structure may be XML, JSON, HTML, CSV, or the like.

At 315, the server 305-a may parse the first file according to the first hierarchical structure to identify the first set of elements.

At 320, the server 305-a may modify, based at least in part on the first set of elements, the first file to include metadata that describes a first element of the first set of elements. Modification of the file may include adding a byte that describes the element or value or adding one or more indexes (e.g., an index table) that describe the set of elements. For example, modifying the file may include adding an index, a global token index, a locations cache, an index table, etc. as described herein. The indexes may include tokens that indicate offsets, nesting depths, token types, lengths, name hashes, schema flags, etc. for each element or a subset of elements in the file.

At 325, the server 305 may store the modified file in a binary format for access to the first element based at least in part on the metadata. Thus, the file may be saved according to the binary format in order to support efficient access. In some cases, the access may support data transformation for use by another service, such as a service supported by the server 305-b. Thus, at 330, the data may be transformed and provided to server 305-b.

Figure 4:
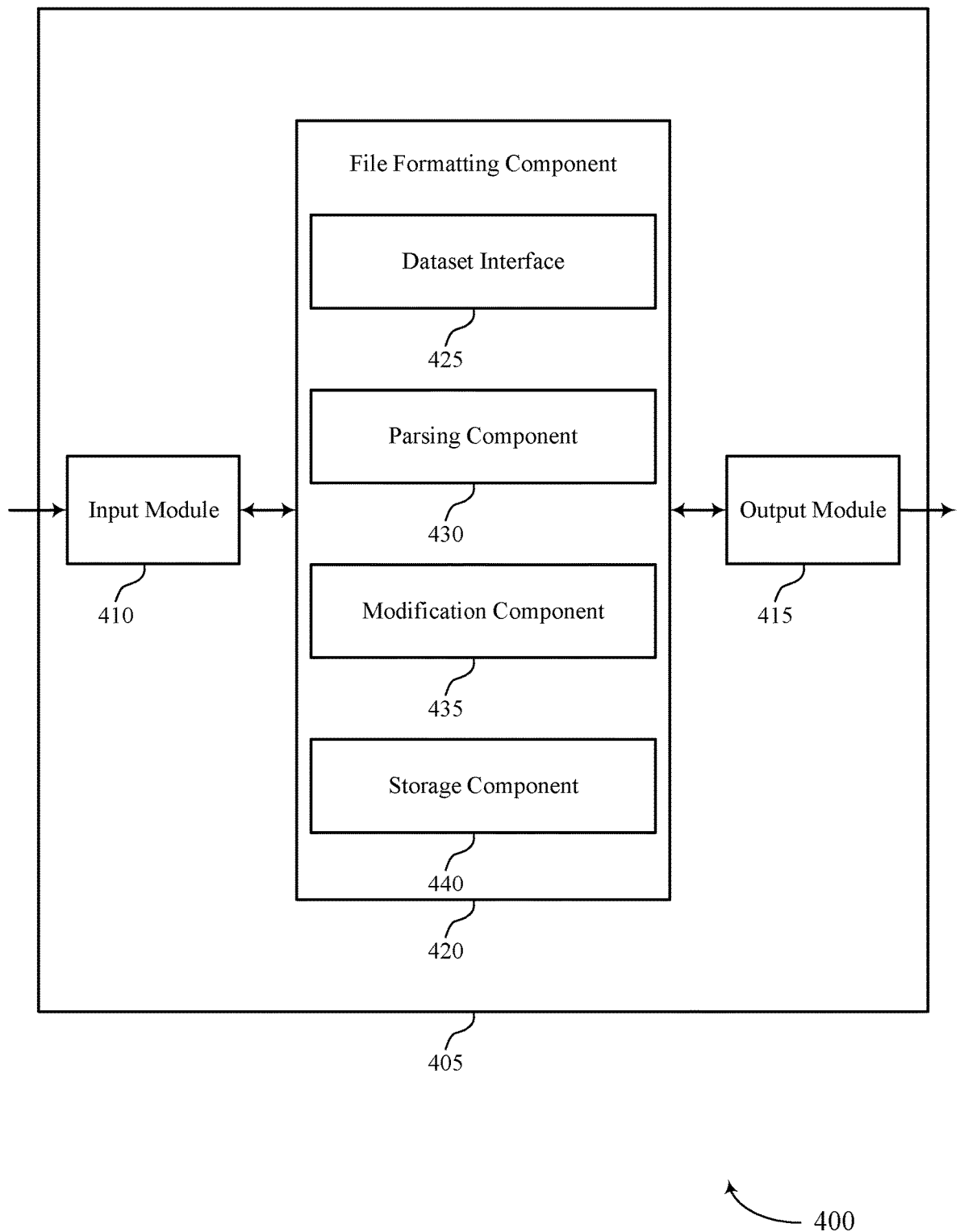
FIG. 4 shows a block diagram of an apparatus that supports data transformation using binary serialization format in accordance with aspects of the present disclosure.

FIG. 4 shows a block diagram 400 of a device 405 that supports data transformation using binary serialization format in accordance with aspects of the present disclosure. The device 405 may include an input module 410, an output module 415, and a file formatting component 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the file formatting component 420 to support data transformation using binary serialization format. In some cases, the input module 410 may be a component of an I/O controller 610 as described with reference to FIG. 6.

The output module 415 may manage output signals for the device 405. For example, the output module 415 may receive signals from other components of the device 405, such as the file formatting component 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the file formatting component 420 may include a dataset interface 425, a parsing component 430, a modification component 435, a storage component 440, or any combination thereof. In some examples, the file formatting component 420, or various components thereof, may be configured to perform various operations (e.g., receiving, monitoring, transmitting) using or otherwise in cooperation with the input module 410, the output module 415, or both. For example, the file formatting component 420 may receive information from the input module 410, send information to the output module 415, or be integrated in combination with the input module 410, the output module 415, or both to receive information, transmit information, or perform various other operations as described herein.

The file formatting component 420 may support data processing in accordance with examples as disclosed herein. The dataset interface 425 may be configured as or otherwise support a means for receiving a dataset including a first file that includes a first set of elements formatted according to a first hierarchical structure. The parsing component 430 may be configured as or otherwise support a means for parsing the first file according to the first hierarchical structure to identify the first set of elements. The modification component 435 may be configured as or otherwise support a means for modifying, based at least in part on the first set of elements, the first file to include metadata that describes a first element of the first set of elements. The storage component 440 may be configured as or otherwise support a means for storing the modified file in a binary format for access to the first element based at least in part on the metadata.

Figure 5:
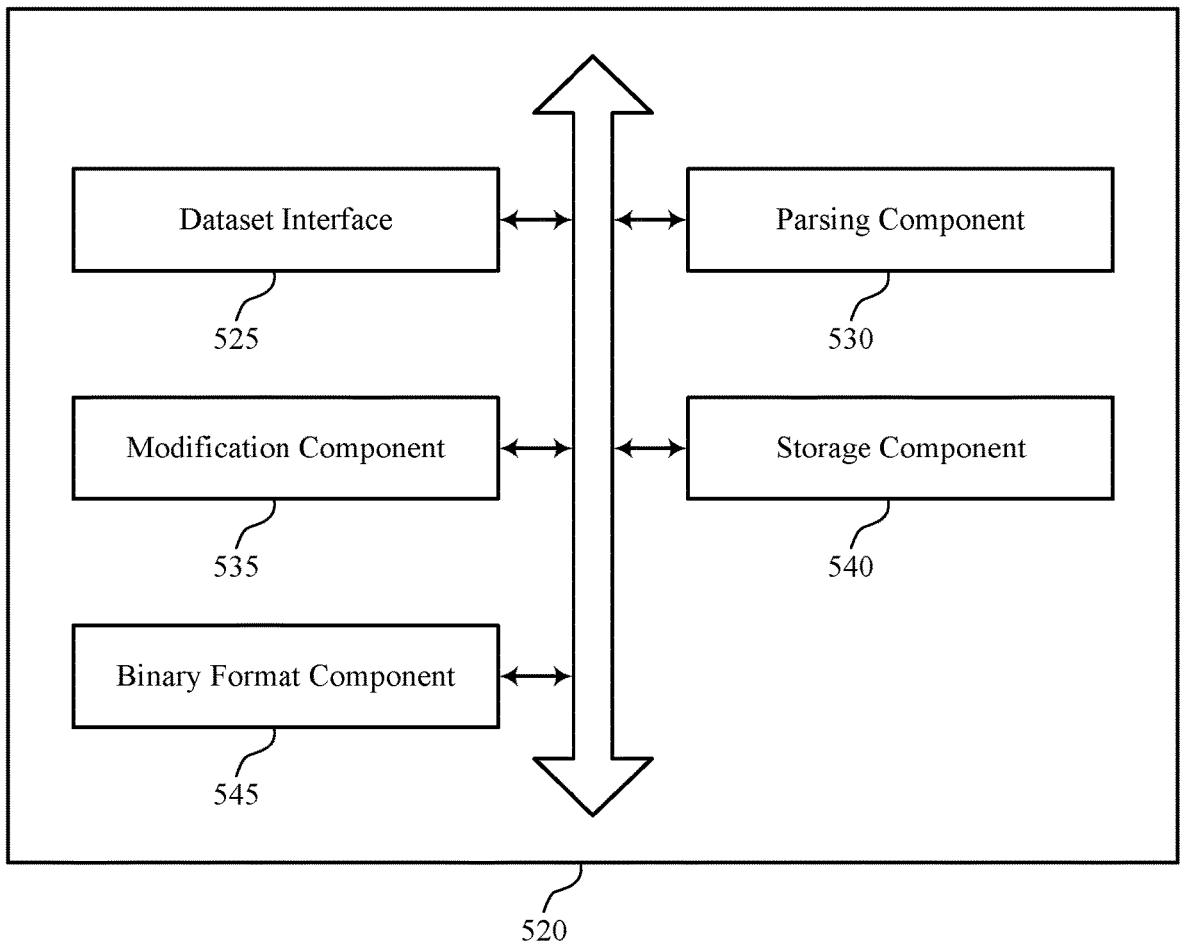
FIG. 5 shows a block diagram of a file formatting component that supports data transformation using binary serialization format in accordance with aspects of the present disclosure.

FIG. 5 shows a block diagram 500 of a file formatting component 520 that supports data transformation using binary serialization format in accordance with aspects of the present disclosure. The file formatting component 520 may be an example of aspects of a file formatting component or a file formatting component 420, or both, as described herein. The file formatting component 520, or various components thereof, may be an example of means for performing various aspects of data transformation using binary serialization format as described herein. For example, the file formatting component 520 may include a dataset interface 525, a parsing component 530, a modification component 535, a storage component 540, a binary format component 545, or any combination thereof. Each of these components may communicate, directly or indirectly, with one another (e.g., via one or more buses).

The file formatting component 520 may support data processing in accordance with examples as disclosed herein. The dataset interface 525 may be configured as or otherwise support a means for receiving a dataset including a first file that includes a first set of elements formatted according to a first hierarchical structure. The parsing component 530 may be configured as or otherwise support a means for parsing the first file according to the first hierarchical structure to identify the first set of elements. The modification component 535 may be configured as or otherwise support a means for modifying, based at least in part on the first set of elements, the first file to include metadata that describes a first element of the first set of elements. The storage component 540 may be configured as or otherwise support a means for storing the modified file in a binary format for access to the first element based at least in part on the metadata.

In some examples, the parsing component 530 may be configured as or otherwise support a means for parsing the second file according to the second hierarchical structure to identify the second set of elements. In some examples, the modification component 535 may be configured as or otherwise support a means for modifying the second file to include a second instance of the metadata that describes a second element of the second set of elements.

In some examples, to support modifying the first file, the modification component 535 may be configured as or otherwise support a means for including, within the first file, an index table that specifies each element name of the first set of elements. In some examples, to support modifying the first file, the modification component 535 may be configured as or otherwise support a means for replacing an element name of the first element with an index value that references the name in the index table.

In some examples, to support modifying the first file, the modification component 535 may be configured as or otherwise support a means for including, within the first file, a token index that includes a value token and a name token for each element of the first set of elements.

In some examples, the value token includes a set of bits representing a starting offset relative to a beginning of the first file, a nesting depth, a token type, a schema flag, a length, or a combination thereof.

In some examples, the name token includes a set of bits representing a starting offset relative to a beginning of the first file, a nesting depth, a token type, a length, a name hash, or a combination thereof.

In some examples, to support modifying the first file, the binary format component 545 may be configured as or otherwise support a means for inserting, within the binary format, byte for each element of the first set of elements, wherein the byte includes the metadata describing each element.

In some examples, to support modifying the first file, the modification component 535 may be configured as or otherwise support a means for including, within the first file, a locations cache index that includes hierarchical information corresponding to each element of the first set of elements.

In some examples, the first hierarchical structure is JSON, XML, CSV, or HTML.

Figure 6:
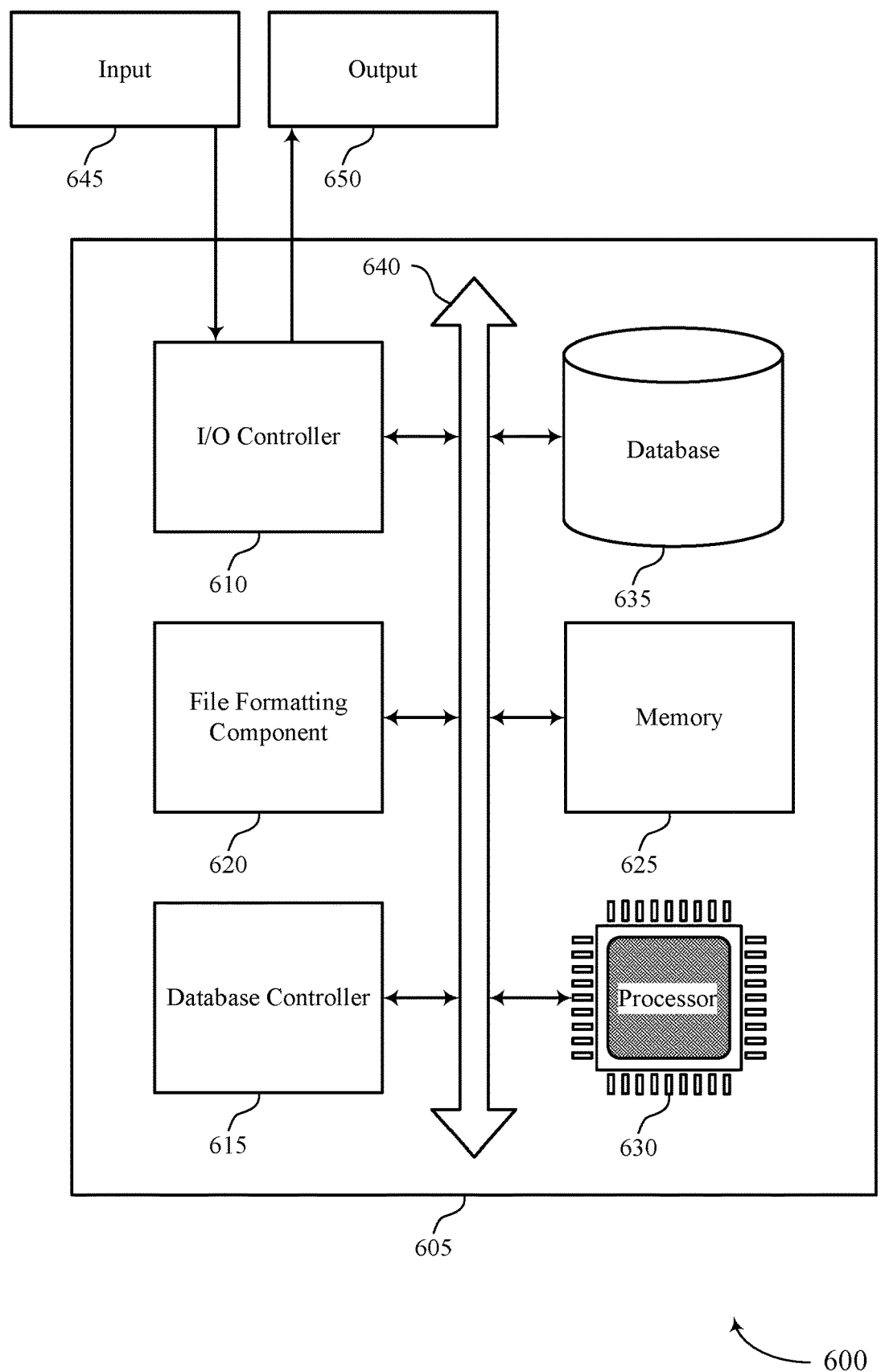
FIG. 6 shows a diagram of a system including a device that supports data transformation using binary serialization format in accordance with aspects of the present disclosure.

FIG. 6 shows a diagram of a system 600 including a device 605 that supports data transformation using binary serialization format in accordance with aspects of the present disclosure. The device 605 may be an example of or include the components of a device 405 as described herein. The device 605 may include components for bi-directional data communications including components for transmitting and receiving communications, such as a file formatting component 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting data transformation using binary serialization format).

The file formatting component 620 may support data processing in accordance with examples as disclosed herein. For example, the file formatting component 620 may be configured as or otherwise support a means for receiving a dataset including a first file that includes a first set of elements formatted according to a first hierarchical structure. The file formatting component 620 may be configured as or otherwise support a means for parsing the first file according to the first hierarchical structure to identify the first set of elements. The file formatting component 620 may be configured as or otherwise support a means for modifying, based at least in part on the first set of elements, the first file to include metadata that describes a first element of the first set of elements. The file formatting component 620 may be configured as or otherwise support a means for storing the modified file in a binary format for access to the first element based at least in part on the metadata.

Figure 7:
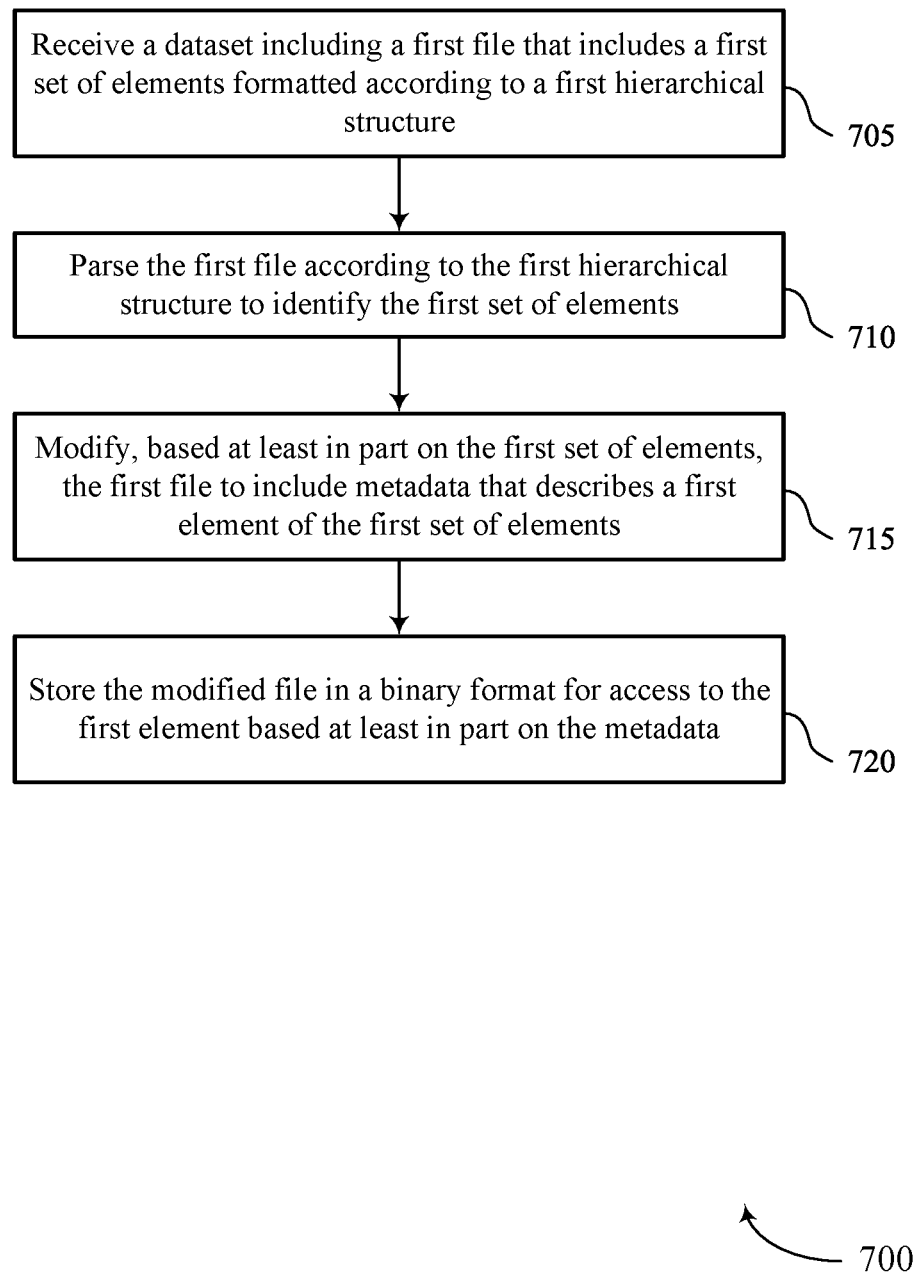
FIGS. 7 through 11 show flowcharts illustrating methods that support data transformation using binary serialization format in accordance with aspects of the present disclosure.

FIG. 7 shows a flowchart illustrating a method 700 that supports data transformation using binary serialization format in accordance with aspects of the present disclosure. The operations of the method 700 may be implemented by a server or its components as described herein. For example, the operations of the method 700 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 705, the method may include receiving a dataset including a first file that includes a first set of elements formatted according to a first hierarchical structure. The operations of 705 may be performed in accordance with examples as disclosed herein. In some examples, aspects of the operations of 705 may be performed by a dataset interface 525 as described with reference to FIG. 5.

At 710, the method may include parsing the first file according to the first hierarchical structure to identify the first set of elements. The operations of 710 may be performed in accordance with examples as disclosed herein. In some examples, aspects of the operations of 710 may be performed by a parsing component 530 as described with reference to FIG. 5.

At 715, the method may include modifying, based at least in part on the first set of elements, the first file to include metadata that describes a first element of the first set of elements. The operations of 715 may be performed in accordance with examples as disclosed herein. In some examples, aspects of the operations of 715 may be performed by a modification component 535 as described with reference to FIG. 5.

At 720, the method may include storing the modified file in a binary format for access to the first element based at least in part on the metadata. The operations of 720 may be performed in accordance with examples as disclosed herein. In some examples, aspects of the operations of 720 may be performed by a storage component 540 as described with reference to FIG. 5.

Figure 8:
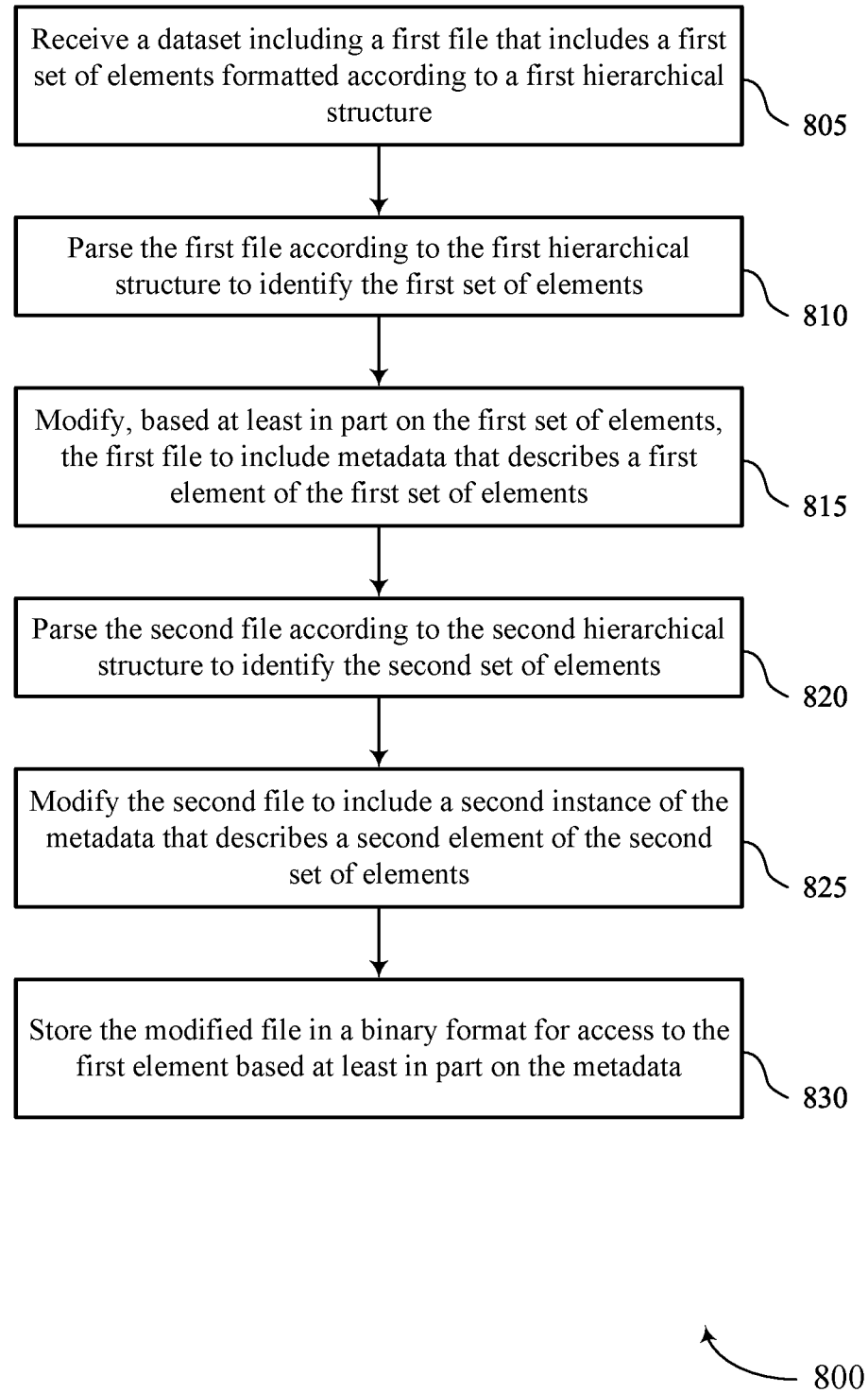

FIG. 8 shows a flowchart illustrating a method 800 that supports data transformation using binary serialization format in accordance with aspects of the present disclosure. The operations of the method 800 may be implemented by a server or its components as described herein. For example, the operations of the method 800 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 805, the method may include receiving a dataset including a first file that includes a first set of elements formatted according to a first hierarchical structure. The operations of 805 may be performed in accordance with examples as disclosed herein. In some examples, aspects of the operations of 805 may be performed by a dataset interface 525 as described with reference to FIG. 5.

At 810, the method may include parsing the first file according to the first hierarchical structure to identify the first set of elements. The operations of 810 may be performed in accordance with examples as disclosed herein. In some examples, aspects of the operations of 810 may be performed by a parsing component 530 as described with reference to FIG. 5.

At 815, the method may include modifying, based at least in part on the first set of elements, the first file to include metadata that describes a first element of the first set of elements. The operations of 815 may be performed in accordance with examples as disclosed herein. In some examples, aspects of the operations of 815 may be performed by a modification component 535 as described with reference to FIG. 5.

At 820, the method may include parsing the second file according to the second hierarchical structure to identify the second set of elements. The operations of 820 may be performed in accordance with examples as disclosed herein. In some examples, aspects of the operations of 820 may be performed by a parsing component 530 as described with reference to FIG. 5.

At 825, the method may include modifying the second file to include a second instance of the metadata that describes a second element of the second set of elements. The operations of 825 may be performed in accordance with examples as disclosed herein. In some examples, aspects of the operations of 825 may be performed by a modification component 535 as described with reference to FIG. 5.

At 830, the method may include storing the modified file in a binary format for access to the first element based at least in part on the metadata. The operations of 830 may be performed in accordance with examples as disclosed herein. In some examples, aspects of the operations of 830 may be performed by a storage component 540 as described with reference to FIG. 5.

Figure 9:
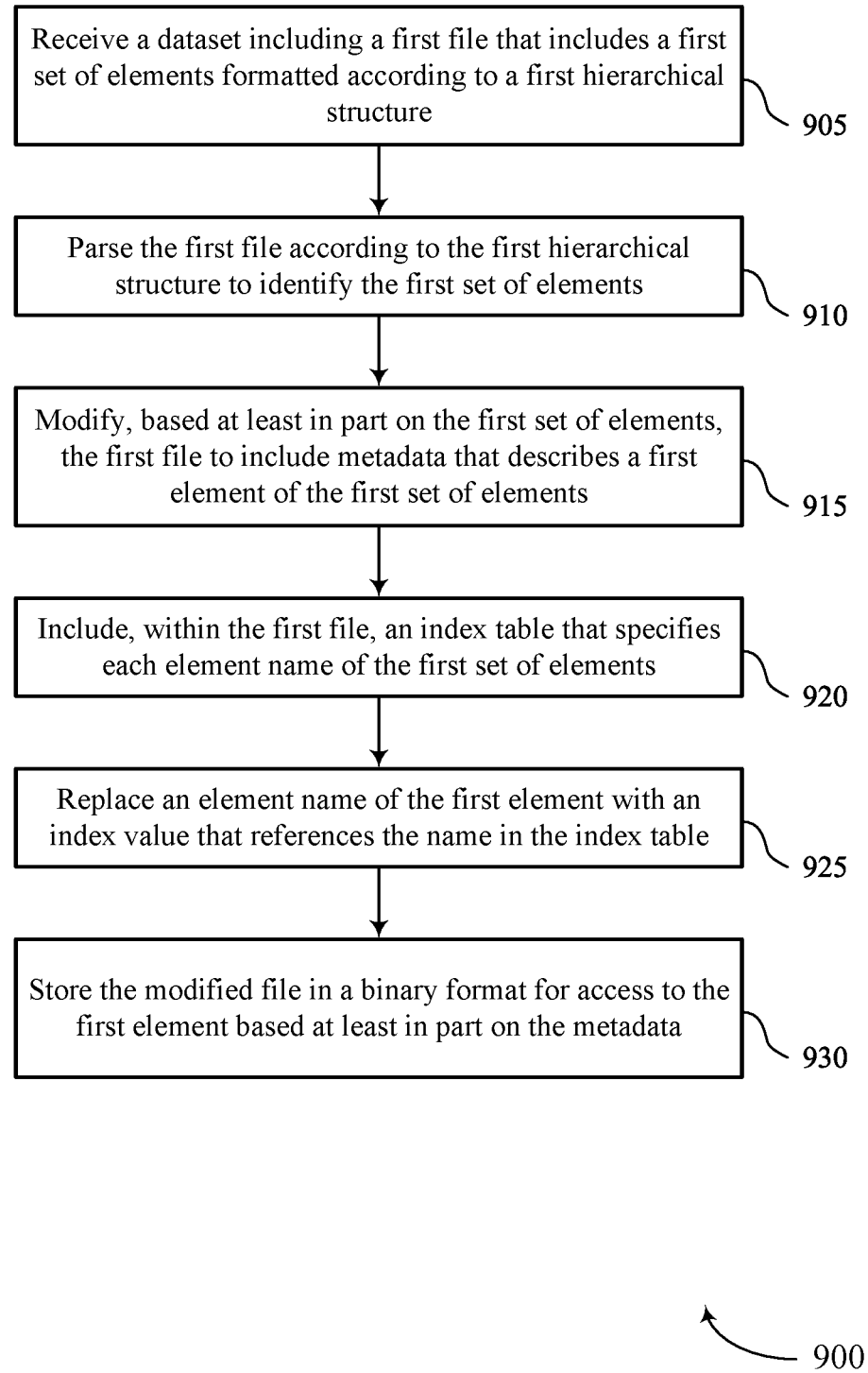

FIG. 9 shows a flowchart illustrating a method 900 that supports data transformation using binary serialization format in accordance with aspects of the present disclosure. The operations of the method 900 may be implemented by a server or its components as described herein. For example, the operations of the method 900 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 905, the method may include receiving a dataset including a first file that includes a first set of elements formatted according to a first hierarchical structure. The operations of 905 may be performed in accordance with examples as disclosed herein. In some examples, aspects of the operations of 905 may be performed by a dataset interface 525 as described with reference to FIG. 5.

At 910, the method may include parsing the first file according to the first hierarchical structure to identify the first set of elements. The operations of 910 may be performed in accordance with examples as disclosed herein. In some examples, aspects of the operations of 910 may be performed by a parsing component 530 as described with reference to FIG. 5.

At 915, the method may include modifying, based at least in part on the first set of elements, the first file to include metadata that describes a first element of the first set of elements. The operations of 915 may be performed in accordance with examples as disclosed herein. In some examples, aspects of the operations of 915 may be performed by a modification component 535 as described with reference to FIG. 5.

At 920, the method may include including, within the first file, an index table that specifies each element name of the first set of elements. The operations of 920 may be performed in accordance with examples as disclosed herein. In some examples, aspects of the operations of 920 may be performed by a modification component 535 as described with reference to FIG. 5.

At 925, the method may include replacing an element name of the first element with an index value that references the name in the index table. The operations of 925 may be performed in accordance with examples as disclosed herein.

In some examples, aspects of the operations of 925 may be performed by a modification component 535 as described with reference to FIG. 5.

At 930, the method may include storing the modified file in a binary format for access to the first element based at least in part on the metadata. The operations of 930 may be performed in accordance with examples as disclosed herein. In some examples, aspects of the operations of 930 may be performed by a storage component 540 as described with reference to FIG. 5.

Figure 10:
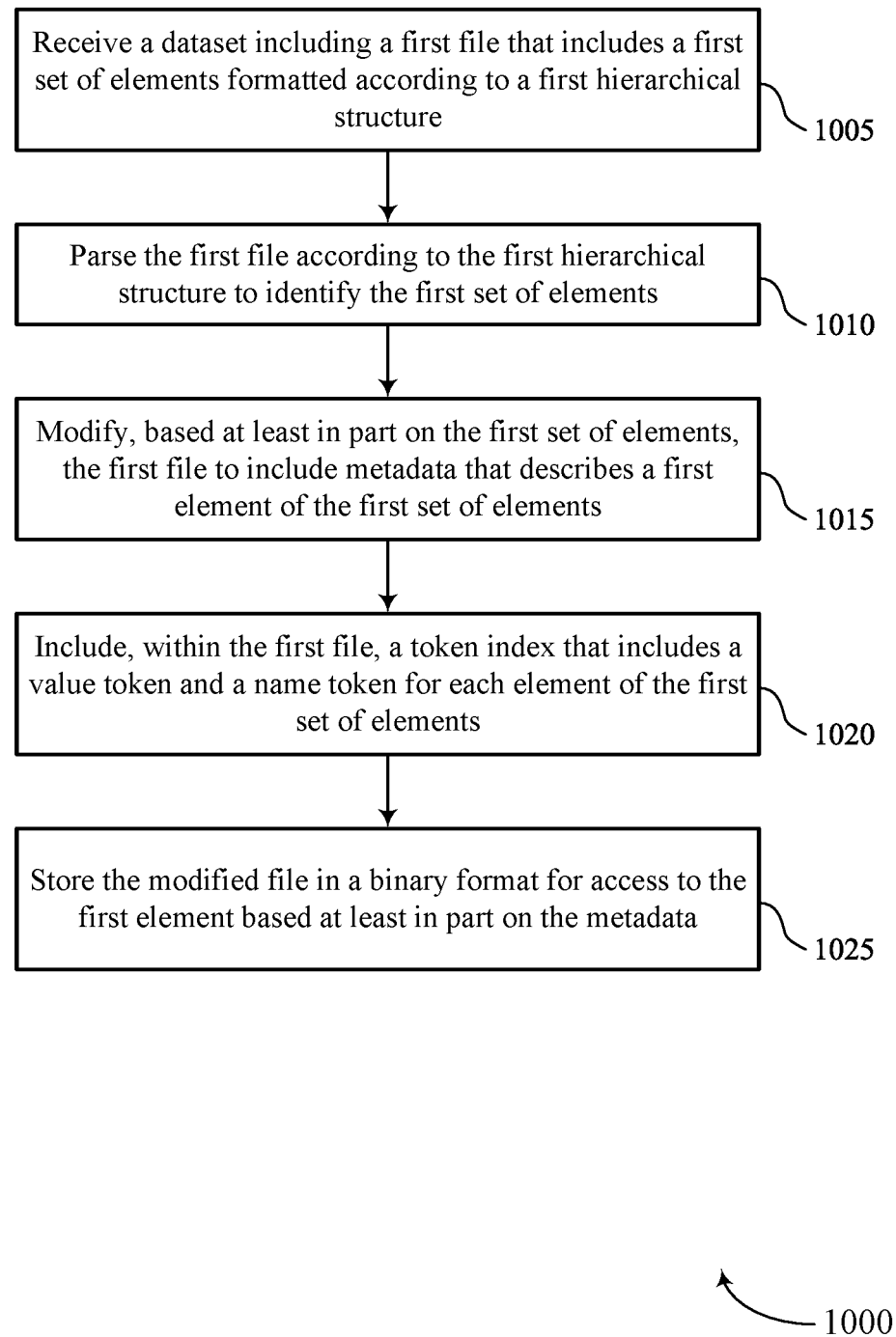

FIG. 10 shows a flowchart illustrating a method 1000 that supports data transformation using binary serialization format in accordance with aspects of the present disclosure. The operations of the method 1000 may be implemented by a server or its components as described herein. For example, the operations of the method 1000 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 1005, the method may include receiving a dataset including a first file that includes a first set of elements formatted according to a first hierarchical structure. The operations of 1005 may be performed in accordance with examples as disclosed herein. In some examples, aspects of the operations of 1005 may be performed by a dataset interface 525 as described with reference to FIG. 5.

At 1010, the method may include parsing the first file according to the first hierarchical structure to identify the first set of elements. The operations of 1010 may be performed in accordance with examples as disclosed herein. In some examples, aspects of the operations of 1010 may be performed by a parsing component 530 as described with reference to FIG. 5.

At 1015, the method may include modifying, based at least in part on the first set of elements, the first file to include metadata that describes a first element of the first set of elements. The operations of 1015 may be performed in accordance with examples as disclosed herein. In some examples, aspects of the operations of 1015 may be performed by a modification component 535 as described with reference to FIG. 5.

At 1020, the method may include including, within the first file, a token index that includes a value token and a name token for each element of the first set of elements. The operations of 1020 may be performed in accordance with examples as disclosed herein. In some examples, aspects of the operations of 1020 may be performed by a modification component 535 as described with reference to FIG. 5.

At 1025, the method may include storing the modified file in a binary format for access to the first element based at least in part on the metadata. The operations of 1025 may be performed in accordance with examples as disclosed herein. In some examples, aspects of the operations of 1025 may be performed by a storage component 540 as described with reference to FIG. 5.

Figure 11:
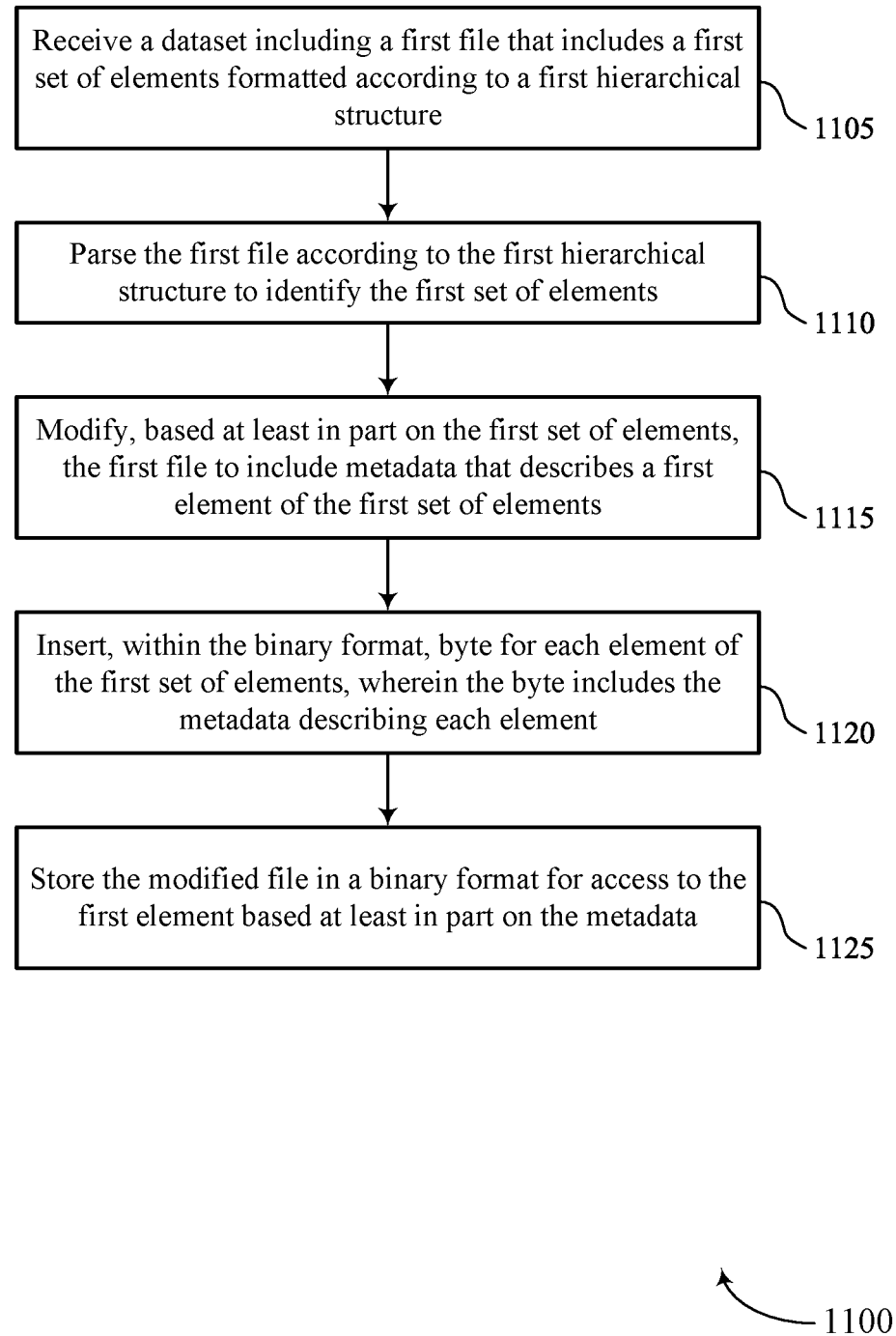

FIG. 11 shows a flowchart illustrating a method 1100 that supports data transformation using binary serialization format in accordance with aspects of the present disclosure. The operations of the method 1100 may be implemented by a server or its components as described herein. For example, the operations of the method 1100 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 1105, the method may include receiving a dataset including a first file that includes a first set of elements formatted according to a first hierarchical structure. The operations of 1105 may be performed in accordance with examples as disclosed herein. In some examples, aspects of the operations of 1105 may be performed by a dataset interface 525 as described with reference to FIG. 5.

At 1110, the method may include parsing the first file according to the first hierarchical structure to identify the first set of elements. The operations of 1110 may be performed in accordance with examples as disclosed herein. In some examples, aspects of the operations of 1110 may be performed by a parsing component 530 as described with reference to FIG. 5.

At 1115, the method may include modifying, based at least in part on the first set of elements, the first file to include metadata that describes a first element of the first set of elements. The operations of 1115 may be performed in accordance with examples as disclosed herein. In some examples, aspects of the operations of 1115 may be performed by a modification component 535 as described with reference to FIG. 5.

At 1120, the method may include inserting, within the binary format, byte for each element of the first set of elements, wherein the byte includes the metadata describing each element. The operations of 1120 may be performed in accordance with examples as disclosed herein. In some examples, aspects of the operations of 1120 may be performed by a binary format component 545 as described with reference to FIG. 5.

At 1125, the method may include storing the modified file in a binary format for access to the first element based at least in part on the metadata. The operations of 1125 may be performed in accordance with examples as disclosed herein. In some examples, aspects of the operations of 1125 may be performed by a storage component 540 as described with reference to FIG. 5.

A method for data processing is described. The method may include receiving a dataset including a first file that includes a first set of elements formatted according to a first hierarchical structure, parsing the first file according to the first hierarchical structure to identify the first set of elements, modifying, based at least in part on the first set of elements, the first file to include metadata that describes a first element of the first set of elements, and storing the modified file in a binary format for access to the first element based at least in part on the metadata.

An apparatus for data processing is described. The apparatus may include a processor, memory coupled with the processor, and instructions stored in the memory. The instructions may be executable by the processor to cause the apparatus to receive a dataset including a first file that includes a first set of elements formatted according to a first hierarchical structure, parse the first file according to the first hierarchical structure to identify the first set of elements, modify, based at least in part on the first set of elements, the first file to include metadata that describes a first element of the first set of elements, and store the modified file in a binary format for access to the first element based at least in part on the metadata.

Another apparatus for data processing is described. The apparatus may include means for receiving a dataset including a first file that includes a first set of elements formatted according to a first hierarchical structure, means for parsing the first file according to the first hierarchical structure to identify the first set of elements, means for modifying, based at least in part on the first set of elements, the first file to include metadata that describes a first element of the first set of elements, and means for storing the modified file in a binary format for access to the first element based at least in part on the metadata.

A non-transitory computer-readable medium storing code for data processing is described. The code may include instructions executable by a processor to receive a dataset including a first file that includes a first set of elements formatted according to a first hierarchical structure, parse the first file according to the first hierarchical structure to identify the first set of elements, modify, based at least in part on the first set of elements, the first file to include metadata that describes a first element of the first set of elements, and store the modified file in a binary format for access to the first element based at least in part on the metadata.

Some examples of the method, apparatuses, and non-transitory computer-readable medium described herein may support the dataset including a second file with a second set of elements formatted according to a second hierarchical structure and may further include operations, features, means, or instructions for parsing the second file according to the second hierarchical structure to identify the second set of elements and modifying the second file to include a second instance of the metadata that describes a second element of the second set of elements.

In some examples of the method, apparatuses, and non-transitory computer-readable medium described herein, modifying the first file may include operations, features, means, or instructions for including, within the first file, an index table that specifies each element name of the first set of elements and replacing an element name of the first element with an index value that references the element name in the index table.

In some examples of the method, apparatuses, and non-transitory computer-readable medium described herein, modifying the first file may include operations, features, means, or instructions for including, within the first file, a token index that includes a value token and a name token for each element of the first set of elements.

In some examples of the method, apparatuses, and non-transitory computer-readable medium described herein, the value token includes a set of bits representing a starting offset relative to a beginning of the first file, a nesting depth, a token type, a schema flag, a length, or a combination thereof.

In some examples of the method, apparatuses, and non-transitory computer-readable medium described herein, the name token includes a set of bits representing a starting offset relative to a beginning of the first file, a nesting depth, a token type, a length, a name hash, or a combination thereof.

In some examples of the method, apparatuses, and non-transitory computer-readable medium described herein, modifying the first file may include operations, features, means, or instructions for inserting, within the binary format, byte for each element of the first set of elements, wherein the byte includes the metadata describing each element.

In some examples of the method, apparatuses, and non-transitory computer-readable medium described herein, modifying the first file may include operations, features, means, or instructions for including, within the first file, a locations cache index that includes hierarchical information corresponding to each element of the first set of elements.

In some examples of the method, apparatuses, and non-transitory computer-readable medium described herein, the first hierarchical structure may be JSON, XML, CSV, or HTML.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
 receiving a dataset including a first file that includes a first set of elements formatted according to a first hierarchical structure, wherein a first service is configured to access the first file according to the format of the first set of elements and a second service is configured to access the first file according to a second format;
 parsing the first file according to the first hierarchical structure to identify the first set of elements;
 modifying, based at least in part on the first set of elements and the second service being configured to access the first file according to the second format, the first file to include an index table that specifies each element name of the first set of elements and replacing an element name of a first element of the first set of elements with an index value that references the element name in the index table, wherein the index table describes each element of the first set of elements;
 transforming the modified first file including the index table to a binary format for random access to the first set of elements by the second service using the index table included in the modified first file that is transformed to the binary format, wherein the first set of elements formatted in the first hierarchical structure are sequentially accessible by the second service or are accessible by the second service via loading a document object model (DOM);
 storing the modified first file including the index table in the binary format for the random access to the first set of elements by the second service; and
 individually accessing an element of the first set of elements using the random access while the modified first file is stored in the binary format based at least in part on the index table included in the first file.

2. The method of claim 1, wherein the dataset includes a second file with a second set of elements formatted to a second hierarchical structure, further comprising:
 parsing the second file according to the second hierarchical structure to identify the second set of elements; and
 modifying the second file to include a second instance of the index table that describes a second element of the second set of elements.

3. The method of claim 1, wherein the modifying the first file comprises:
 including, within the first file, a token index that includes a value token and a name token for each element of the first set of elements.

4. The method of claim 3, wherein the value token includes a set of bits representing a starting offset relative to a beginning of the first file, a nesting depth, a token type, a schema flag, a length, or a combination thereof.

5. The method of claim 3, wherein the name token includes a set of bits representing a starting offset relative to a beginning of the first file, a nesting depth, a token type, a length, a name hash, or a combination thereof.

6. The method of claim 1, wherein the modifying the first file comprises:
 inserting, within the binary format, a byte for each element of the first set of elements, wherein the byte includes the index table describing each element.

7. The method of claim 1, wherein the modifying the first file comprises:
 including, within the first file, a locations cache index that includes hierarchical information corresponding to each element of the first set of elements.

8. The method of claim 1, wherein the first hierarchical structure is JSON, XML, CSV, or HTML.

9. An apparatus for data processing, comprising:
 a processor;
 memory coupled with the processor; and
 instructions stored in the memory and executable by the processor to cause the apparatus to:
  receive a dataset including a first file that includes a first set of elements formatted according to a first hierarchical structure, wherein a first service is configured to access the first file according to the format of the first set of elements and a second service is configured to access the first file according to a second format;

parse the first file according to the first hierarchical structure to identify the first set of elements;

modify, based at least in part on the first set of elements and the second service being configured to access the first file according to the second format, the first file to include an index table that specifies each element name of the first set of elements and replacing an element name of a first element of the first set of elements with an index value that references the element name in the index table, wherein the index table describes each element of the first set of elements;

transform the modified first file including the index table to a binary format for random access to the first set of elements by the second service using the index table included in the modified first file that is transformed to the binary format, wherein the first set of elements formatted in the first hierarchical structure are sequentially accessible by the second service or are accessible by the second service via loading a document object model (DOM);

store the modified first file including the index table in the binary format for the random access to the first set of elements by the second service; and individually access an element of the first set of elements using the random access while the modified first file is stored in the binary format based at least in part on the index table included in the first file.

10. The apparatus of claim 9, wherein the dataset includes a second file with a second set of elements formatted to a second hierarchical structure, and wherein the instructions are further executable by the processor to cause the apparatus to:

parse the second file according to the second hierarchical structure to identify the second set of elements; and modify the second file to include a second instance of the index table that describes a second element of the second set of elements.

11. The apparatus of claim 9, wherein the instructions to modify the first file are executable by the processor to cause the apparatus to:

include, within the first file, a token index that includes a value token and a name token for each element of the first set of elements.

12. The apparatus of claim 11, wherein the value token includes a set of bits representing a starting offset relative to a beginning of the first file, a nesting depth, a token type, a schema flag, a length, or a combination thereof.

13. The apparatus of claim 11, wherein the name token includes a set of bits representing a starting offset relative to a beginning of the first file, a nesting depth, a token type, a length, a name hash, or a combination thereof.

14. The apparatus of claim 9, wherein the instructions to modify the first file are executable by the processor to cause the apparatus to:

insert, within the binary format, a byte for each element of the first set of elements, wherein the byte includes the index table describing each element.

15. The apparatus of claim 9, wherein the instructions to modify the first file are executable by the processor to cause the apparatus to:

include, within the first file, a locations cache index that includes hierarchical information corresponding to each element of the first set of elements.

16. A non-transitory computer-readable medium storing code for data processing, the code comprising instructions executable by a processor to:

receive a dataset including a first file that includes a first set of elements formatted according to a first hierarchical structure, wherein a first service is configured to access the first file according to the format of the first set of elements and a second service is configured to access the first file according to a second format;

parse the first file according to the first hierarchical structure to identify the first set of elements;

modify, based at least in part on the first set of elements and the second service being configured to access the first file according to the second format, the first file to include an index table that specifies each element name of the first set of elements and replacing an element name of a first element of the first set of elements with an index value that references the element name in the index table, wherein the index table describes each element of the first set of elements;

transform the modified first file including the index table to a binary format for random access to the first set of elements by the second service using the index table included in the modified first file that is transformed to the binary format, wherein the first set of elements formatted in the first hierarchical structure are sequentially accessible by the second service or are accessible by the second service via loading a document object model (DOM);

store the modified first file including the index table in the binary format for the random access to the first set of elements by the second service; and individually access an element of the first set of elements using the random access while the modified first file is stored in the binary format based at least in part on the index table included in the first file.

17. The non-transitory computer-readable medium of claim 16, wherein the dataset includes a second file with a second set of elements formatted to a second hierarchical structure and wherein the instructions are further executable by the processor to:

parse the second file according to the second hierarchical structure to identify the second set of elements; and modify the second file to include a second instance of the index table that describes a second element of the second set of elements.

* * * * *